No. 857,897. PATENTED JUNE 25, 1907.
L. M. PATTERSON.
UNION COUPLING CHECK VALVE.
APPLICATION FILED JAN. 23, 1906.
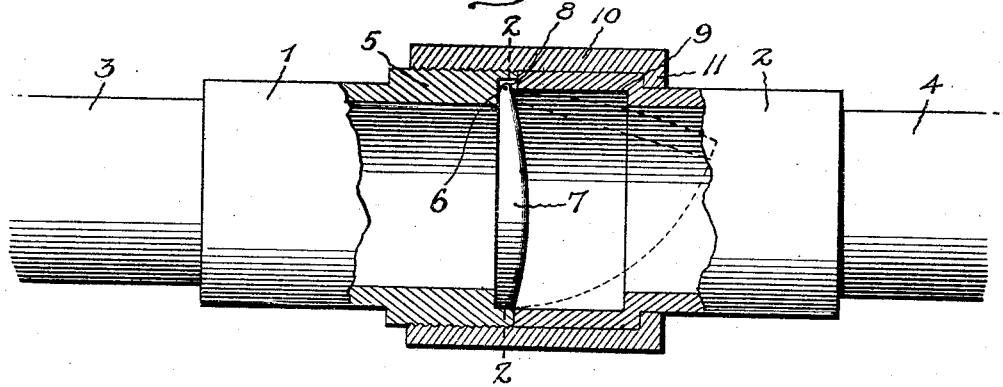
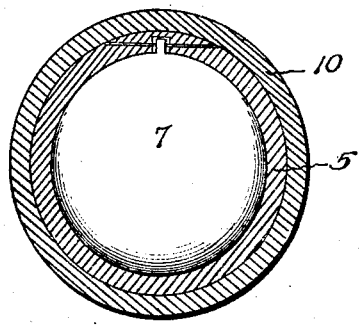
Witnesses
Inventor
Louis M. Patterson
By
Attorneys

UNITED STATES PATENT OFFICE.

LOUIS M. PATTERSON, OF COALFIELD, TENNESSEE.

UNION-COUPLING CHECK-VALVE.

No. 857,897.  Specification of Letters Patent.  Patented June 25, 1907.

Application filed January 23, 1906. Serial No. 297,513.

*To all whom it may concern:*

Be it known that I, LOUIS M. PATTERSON, a citizen of the United States, residing at Coalfield, in the county of Morgan and State of Tennessee, have invented certain new and useful Improvements in Union - Coupling Check-Valves, of which the following is a specification.

This invention relates in general to pipe unions, and is primarily designed to equip the same with check valves, whereby the connection of the union in a pipe line also fits a check valve thereto.

With this object in view, the present invention consists in the combination and arrangement of parts as will be hereinafter more fully described, shown in the accompanying drawing and particularly pointed out in the appended claims, it being understood that changes in the form, proportion, size and minor details may be made within the scope of the claims without departing from the spirit or sacrificing any of the advantages of the invention.

Figure 1 is a longitudinal sectional view of a union coupling check valve of the present invention. Fig. 2 is a cross sectional view on the line 2—2 of Fig. 1.

The present device includes opposite coupling members 1 and 2, respectively, which are tubular and open at opposite ends and of the general form commonly employed in the ordinary type of union couplings. The union members are internally threaded at their outer ends for connection with the respective pipe sections 3 and 4. The coupling member 1 is provided at its inner end with an external annular threaded enlargement 5, and this enlarged portion is provided with an internal annular valve seat 6, with which coöperates a swinging check valve 7 which is pivoted or hinged to the interior of the coupling member by any suitable form of hinge 8. The other coupling member 2 is provided with an external annular shoulder 9 which is rotatably embraced by a sleeve or collar 10, the latter having an internal annular flange 11 engaging the back of the shoulder 9 so as to swivel the collar or sleeve 10 upon the coupling member 2. The sleeve or collar 10 is internally threaded at its outer end and projected beyond the coupling member 2 for engagement with the threaded portion 5 of the coupling member 1, whereby the two coupling members are detachably connected.

While the present invention is useful in many relations, it has been specially designed for use in connection with steam boiler furnaces and the like, and is arranged to have the coupling member 1 connected to the water inlet pipe 3, while the other member 2 is connected to the pipe 4, which is in turn connected to a steam boiler or other source of steam pressure, whereby the back pressure through the pipe 4 and the coupling member 2 normally maintains the valve 7 closed. When the steam pressure is relieved or the water pressure increased the valve 7 will, of course, open, thereby permitting the passage of water through the coupling, and when the steam pressure is increased or the water pressure decreased the valve will be automatically closed and the feed of water shut off and the escape of steam prevented.

From the foregoing description it will be understood that the device of the present invention is entirely complete in itself and may be included in the pipe line in precisely the same manner as an ordinary union or coupling, while at the same time it also has the function of a check valve. Access may be readily had to the valve for repairs or other purposes merely by taking off the sleeve or collar 10 and removing one or both coupling members in the usual manner.

Having thus described the invention, what is claimed is:—

1. A union coupling comprising a pair of tubular open ended members having their outer ends adapted for connection with pipes, means for detachably connecting the members, one member having an internal valve seat at its inner end, and a swinging check valve hinged within said member in coöperative relation with the seat, whereby the valve is accessible when the coupling members are disconnected.

2. A union coupling including a pair of tubular members, one of the members being provided with an internal annular rabbet in its inner end forming a valve seat, a check valve pivoted upon said member and received within the rabbet when closed and coöperating with the seat, and a collar swiveled upon the other member and having a threaded connection with the first-mentioned member.

3. A combined coupling and check valve including opposite tubular coupling members, one of the members having an external threaded portion and an internal annular rabbet in its inner end forming a valve seat, a check valve pivoted to said member within the rabbet and coöperating with the seat, the other member having an external annular shoulder, and a collar swiveled upon the shoulder and provided with an internal annular flange engaging the back of the shoulder, said collar being projected in front of the adjacent member and internally threaded to engage the threaded portion of the first-mentioned member.

In testimony whereof I affix my signature in presence of two witnesses.

LOUIS M. PATTERSON.

Witnesses:
 JAMES ISHAM,
 H. L. SMITH.